Jan. 29, 1963 W. R. ATTWOOD 3,075,622
STRUCTURAL CONNECTOR
Filed Nov. 8, 1960 3 Sheets-Sheet 2
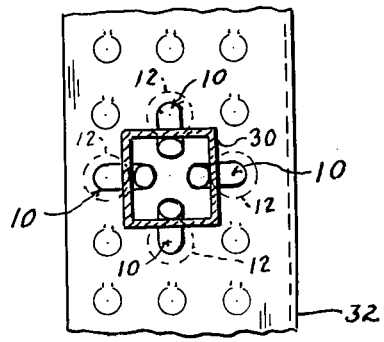
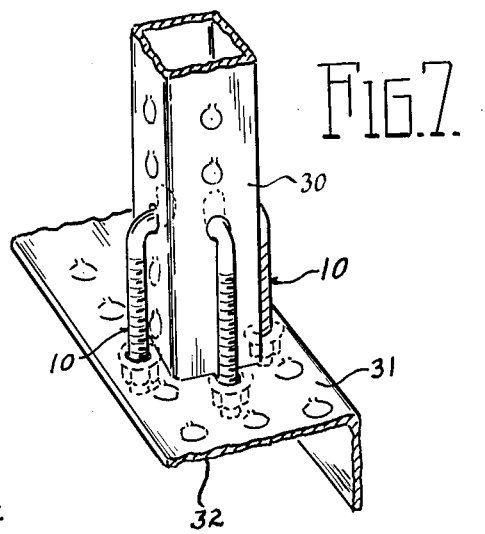
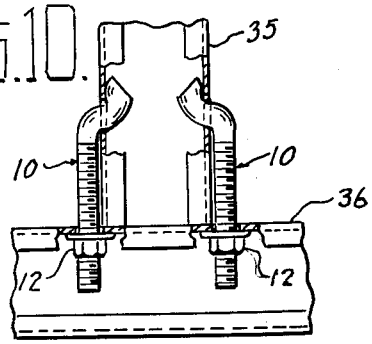
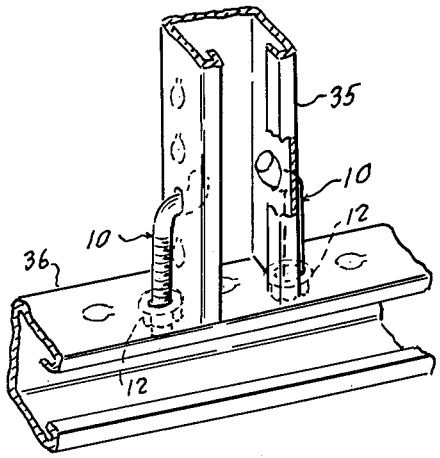
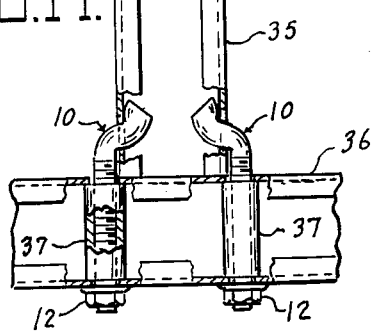
INVENTOR.
Warren R. Attwood Jan. 29, 1963 W. R. ATTWOOD 3,075,622
STRUCTURAL CONNECTOR
Filed Nov. 8, 1960 3 Sheets-Sheet 3

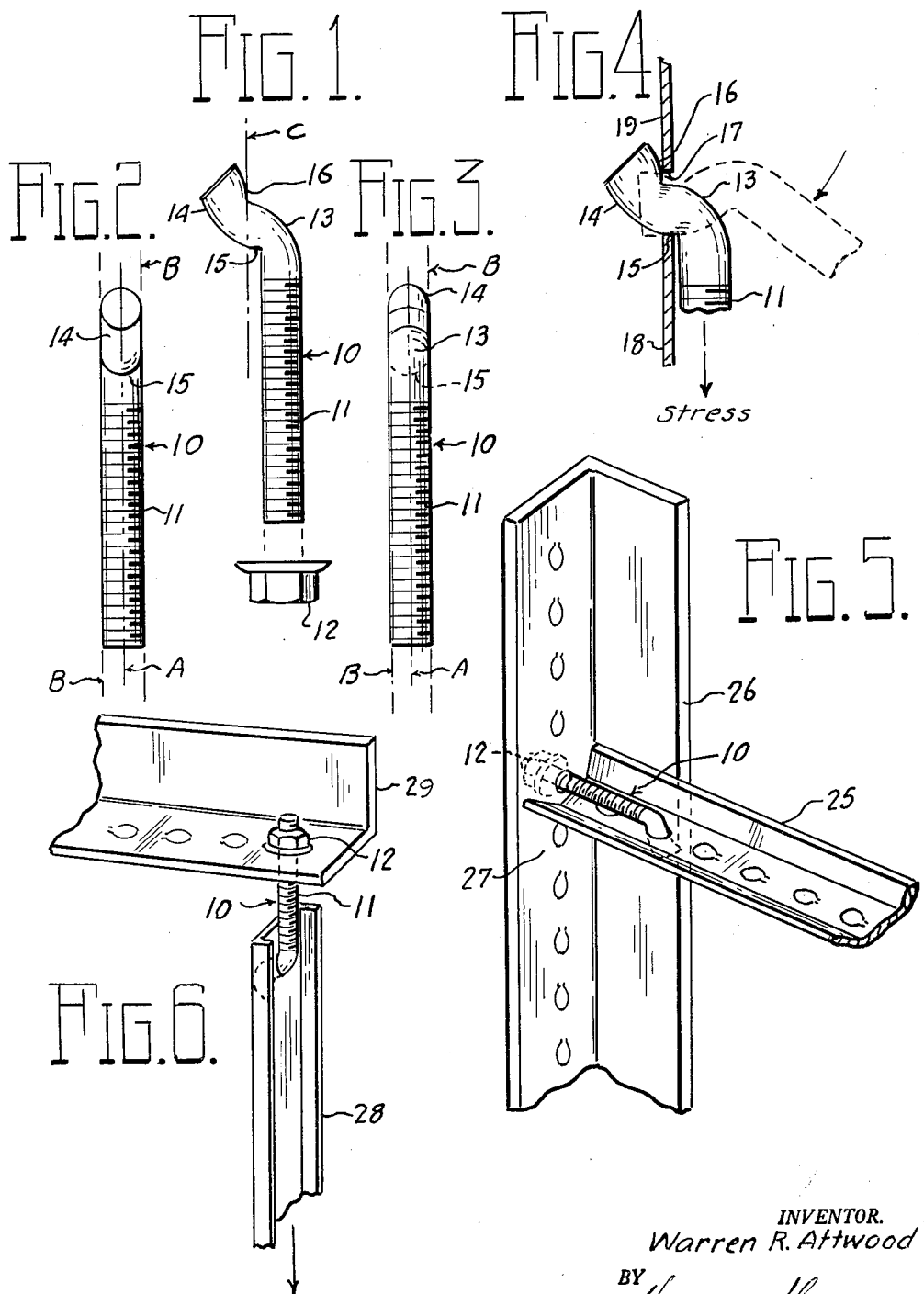

INVENTOR.
Warren R. Attwood
BY Hauke & Hauke
Attorneys.

United States Patent Office 3,075,622
Patented Jan. 29, 1963

3,075,622
STRUCTURAL CONNECTOR
Warren R. Attwood, 4077 2nd St., Wayne, Mich.
Filed Nov. 8, 1960, Ser. No. 67,944
11 Claims. (Cl. 189—36)

My invention relates to structural assemblies and more particularly to a new load and stress carrying connector element for uniting structural members such as plates, angles, channels, panels and the like.

In the development of structural systems such as those described in certain copending patent applications, Ser. No. 833,023 being related to new structural members known as "Perf-O-Strut," Ser. No. 58,874 being related to a new space frame system, and Ser. No. 65,498 being related to a new cuboidal modular structural system, emphasis is laid on such concepts as simplicity and economy in manufacture, standardization of components coupled with versatility in use, readiness of assembly by relatively unskilled workmen using the minimum number of conventional tools, and complete salvageability of structural parts.

In such systems, the means used to connect structural members together must be in conformance with the aforesaid broad concepts in order that complete packages of parts will be made available to the user at a minimum cost and will be easy to use. Other systems of construction heretofore have failed to show a recognition of the facts that elimination of parts and reduction in the number of different parts are necessary if the system is not to become unwieldy or limited in utility.

An object of the present invention is to simplify structural systems by providing an improved connector element capable of being used in a multitude of different ways.

Another object of the invention is to reduce the number of elements needed in making certain structural assemblies by providing an improved Z-bolt which can by itself connect the edge of one member to another member's surface.

A further object of the invention is to increase the versatility of structural systems by providing a new Z-bolt element which may be used both for rigid connection of parts and as an adjustable hanger element.

Yet another object of the invention is to simplify the making of certain structural assemblies by providing a structurally efficient connector which may be engaged with members having inaccessable or closed off portions.

Still a further object of the invention is to expand the utility of perforated structural members such as are described in the patent application Ser. No. 833,023 by providing a simplified connector element engageable with the perforations of structural members either for hanging one member from or clamping it to another member.

For a more complete understanding of the invention, reference may be had to the accompanying drawings in which like reference characters refer to like parts throughout the several views and in which FIGURE 1 is an elevational view in profile of the Z-bolt connector element of my invention.

FIGURE 2 is an elevational view of the element as seen from the left side of FIGURE 1.

FIGURE 3 is an elevational view of the element as seen from the right side of FIGURE 1.

FIGURE 4 is a fragmentary view illustrating the insertion of the element in a perforated plate shown in cross-section.

FIGURE 5 is a perspective view illustrating one use of the Z-bolt in clamping a channel to another structural member.

FIGURE 6 is a perspective view illustrating another use of the Z-bolt as a hanger.

FIGURE 7 is a perspective view illustrating a further use of a plurality of Z-bolts in connecting the butt end of a tubular member to the surface of another structural member.

FIGURE 8 is a top view of the assembly of FIGURE 7 with the tubular member in section.

FIGURE 9 is a perspective view illustrating yet another use of the Z-bolts in connecting a pair of channel members.

FIGURE 10 is an elevational view of the assembly of FIGURE 9 and partly in section.

FIGURE 11 is an elevational view of channels as in FIGURE 10 but connected in another manner by the present Z-bolts.

Figure 14:
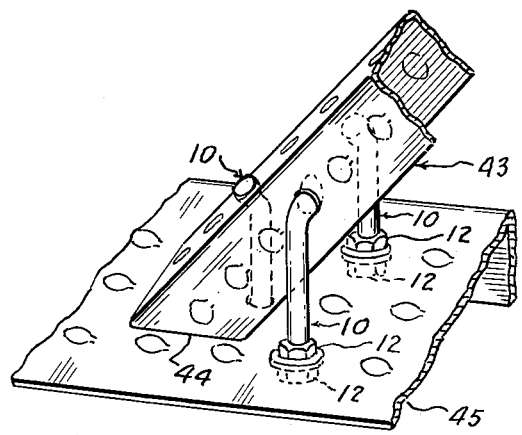
FIGURE 14 is a perspective view illustrating a manner of connecting a channel angularly to a plate member.

It will be seen that the present invention encompasses the preferred Z-bolt construction and the assembly of structural members such as channels, angles and the like using the Z-bolt in a multitude of ways as a connector element. It will be apparent that other assemblies are also possible.

In FIGURES 1–3 the preferred Z-bolt is illustrated as comprising a straight shank portion 11 threaded for the reception of a nut 12 on one end and a laterally extending elbow portion 13 having a further reverse bent extension 14 on its free end.

The shank 11, elbow 13 and extension 14 have axes lying in a common plane A as indicated in FIGURES 2 and 3 and planes B tangent to the outer surfaces of the shank 11 and parallel to plane A are preferably disposed tangentially to the elbow 13 and extension 14.

The line of intersection of the plane A with the surface of the shank 11 and elbow 13 defines a substantially sharp right angle as at L in FIGURE 1 to provide a shoulder 15 extending normal to the shank surface a distance approximately equal to the thickness of the material of the structural member through which the elbow 13 and extension 14 are adapted to extend.

The extension 14 is provided with a straight surface 16 which is disposed in a plane C lying parallel to and spaced from the shank surface adjacent the shoulder 15 a distance approximately equal to the lateral dimension of the shoulder 15.

The structural members with which the elbow engages are provided with perforations, such as at 18 in FIGURE 4 in which it is illustrated that the extension 14 is first inserted through the perforation 17 and then the Z-bolt is rotated so that the shank 11 approaches a face 18 of the structural member. The extension 14 will engage the other face 19 and prevent the bolt from being dislodged from the perforation 17.

When the Z-bolt has been rotated approximately 90 degrees, the shank 11 will lie adjacent the face 17, the shoulder 15 will engage on the edge of the perforation 17, and the surface 16 of the extension 14 will bear against the other face 19. In this position, stresses on the Z-bolt in the direction indicated by the arrow in FIGURE 4 will be transmitted through the shoulder 15 to the structural member in a plane substantially parallel to the faces 18 and 19.

It will be apparent that the diameter of any cross section of the elbow 13 and the extension 14 must be less than the diameter of the perforation 17, while the distance from the shoulder 15 to the end of the extension 14 must be greater than the diameter of the perforation 17.

The Z-bolt structure thus described is readily and inexpensively forged from a simple blank of uniform diameter. The elbow 13 has little or no tendency to straighten out when loaded as do conventional J or L bolts heretofore in use, because extension 14 holds the shank 11 against the face of the member.

It will also be apparent that the Z-bolt may be readily connected to and disconnected from a structural member one side of which is normally inaccessible, as with a tube.

In FIGURE 5, the butt end assembly of a shallow channel 25 with an angle 26 is illustrated. On tightening of the nut 12, the end edge of the channel 25 will be firmly engaged and clamped against the face 27 of the angle member 26.

In FIGURE 6, the use of the bolt 10 for hanging one structural member 28 from another member 29 is illustrated, loading being in the direction of the arrow, and the nut 12 on the threaded shank 11 providing for vertical adjustability.

FIGURES 7 and 8 show how a plurality of Z-bolts 10 may be used to rigidly clamp the end of a tubular structural member 30 to the flat surface 31 of a second structural member 32. This assembly has extremely high load and stress carrying characteristics as may be encountered in buildings and the like.

FIGURES 9 and 10 illustrate how a pair of deep channel members 35 and 36 may be joined, with the nuts 12 disposed within the channel 36.

In FIGURE 11, another method of connecting these channels 35 and 36, in which the shanks of the Z-bolts 12 extend through both side walls of the channel 36, the nuts 10 being disposed on the outside and spacers 37 being provided between the side walls.

Figures 12, 13:
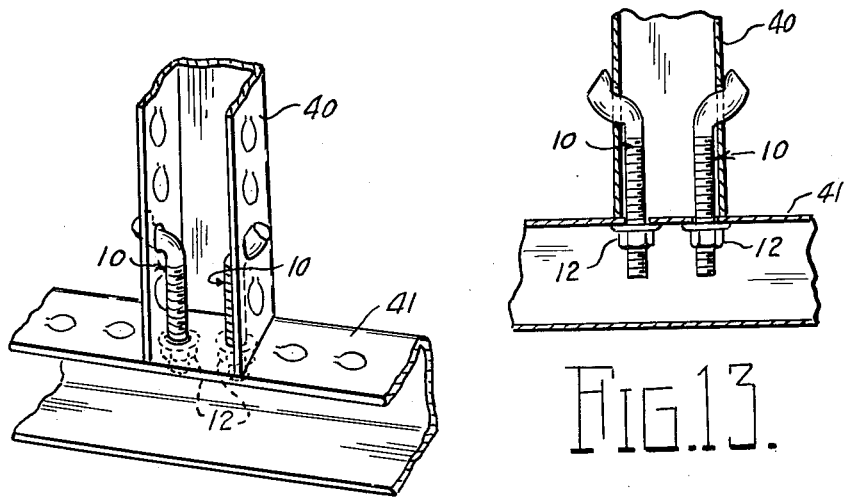
FIGURE 12 is a perspective view of channels connected in a further manner by the present Z-bolts.
FIGURE 13 is a cross-sectional view of the channel assembly of FIGURE 12.

FIGS. 12 and 13 illustrate another way in which channels 40 and 41 may be connected, the shanks of the Z-bolts being disposed on the inside of the channel 40.

In FIGURE 14, a channel 43 having an angular butt end 44 is connected with a plate 45 by means of three Z-bolts 10, are connected to the back web of the channel 43 and two others connected to the side walls of the channel 43, the latter two preferably provided with nuts 12 on both faces of the plate 45 to prevent dislodgement of the channel 43 under multi-directional stresses.

The present Z-bolt is of immense value when used with the structural material known as "Perf-O-Strut" described in patent application Ser. No. 833,023, in which one or more faces of the structural material are provided with rows of knock-outs, any one or more of which may be punched out to provide perforations where connections are needed or desired in building structural frameworks of varying sizes, shapes and designs.

Also, it is noted that when the structural members are provided with knockouts dimensioned on the modular system as described in patent application Ser. No. 65,498 the Z-bolt has even greater versatility. The module in this system is preferably on a one-inch basis. The knockouts are 7/16 inch in diameter and the Z-bolts are 3/8 inch in diameter. The channels such as those shown in FIGURES 9-13 are 1 5/8 inches overall width so that the shanks of the bolts may be connected to adjacent perforations as in FIGURES 12 and 13 or to alternate perforations as in FIGURES 9-11. In FIGURE 7, the tube 30 is also of 1 5/8 inch outside dimensions so that it fits within four spaced knockouts as illustrated.

Various other useful combinations are also possible, limited only by the imagination of the user. Although only a few such embodiments of the invention have been described herein, it will be apparent to one skilled in the art to which the invention pertains that various changes and modifications may be made therein without departing from the spirit of the invention or the scope of the appended claims.

I claim:
1. In a structural assembly,

(a) a first structural member having a bolt receiving perforation,
(b) a second structural member having a bolt receiving perforation,
(c) said members disposed with axes of said perforations normal to each other,
(d) a bolt having a threaded shank portion extending axially through one perforation and a head portion extending normally to said shank portion through the other perforation, and
(e) a nut on the end of said shank portion extending through its respective perforation and urging the members toward one another.

2. In a structural assembly
(a) a first structural member having a surface provided with a bolt receiving perforation,
(b) a second structural member having a surface provided with a second bolt receiving perforation and disposed in a plane an extension of which intersects the first mentioned surface,
(c) said members disposed with the axes of said perforations normal to each other,
(d) a bolt having a threaded shank portion extending axially through said first member perforation and a head portion extending normally to said shank portion through the second member perforation, and
(e) a nut on the end of said shank portion extended through the first perforation and urging the second member surface toward the first member surface.

3. The assembly as defined in claim 1 and in which said head portion has an element shaped to be extendable through the respective perforation only when said shank portion is disposed at other than normal with respect to the axis of its respective perforation.

4. In a structural assembly, a first and a second structural member each provided with a perforation, a connector element clamping said structural members together one to the other and comprising, a Z bolt having a shank portion connected to said first member and a laterally extending elbow portion extending through the perforation of said second member, and the free end of said elbow portion having a further reverse bent extension engaging said second member on the side opposite from the shank portion, said extension extending from the elbow portion in a substantially opposite direction from the shank portion, and means on said shank portion urging said first member toward said second member in a direction normal to the axis of the perforation of said second member.

5. The connector element as defined in claim 4 and in which a plane tangent to the surface of said extension engaging said second member is substantially parallel to a plane tangent to the shank portion adjacent the shoulder and spaced therefrom a distance slightly greater than the thickness of said second member.

6. The assembly as defined in claim 4 and in which the diameter of any cross-section of said elbow portion and said extension is less than the diameter of said perforation and in which the dimension from the shoulder to the end of said extension is greater than the diameter of said perforation.

7. In a structural assembly a first and a second structural member each provided with a perforation, a connector element clamping said structural members together one to the other and comprising a Z bolt having a shank portion connected to said first member and a laterally extending elbow portion extending through the perforation of said second member, the line of intersection of the surfaces of the shank and elbow portions with a plane containing the axes of the shank and elbow portion defining a substantially sharp inside right angle providing a shoulder extending normal to the axis of the shank portion, said shoulder engaged with the edge of said perforation, the free end of said elbow portion having a further reverse bent extension disposed on the other side of said second member from the shank portion, and means on said shank portion urging said first member toward said second member in a direction normal to the axis of the perforation of said second member.

8. The connector element as defined in claim 7 and in which said shoulder extends normal to the adjacent side of said shank portion a distance approximately equal to the thickness of said second member.

9. A structural load carrying assembly comprising two members each having at least one plate portion provided with at least one perforation, said plate portions disposed in planes normal one with the other and one plate portion having an edge abutting the surface of the other plate portion, a connector element connecting said members and comprising a Z bolt having a shank at one end extending through the perforation of the plate portion against which the other plate portion abuts and disposed on an axis parallel with the plane of said other plate portion, the other end of said Z bolt having a laterally extending elbow portion extending through the perforation of said other plate portion and having a further reverse bent extension extending on an axis parallel with said shank axis and disposed on the opposite side of said other plate portion from said shank axis, and means urging said shank through the perforation of the plate portion against which the other plate portion abuts whereby to apply clamping pressure between said plate portions.

10. The assembly as defined in claim 9 and in which said shank and said extension are closely adjacent opposite faces of said other plate portion and operate to restrict displacement of said plate portion.

11. In a structural assembly, a first and a second structural plate member each provided with a perforation, the first plate member having at least one edge, and a connector element clamping said edge to a surface of the second member, said connector element comprising a Z-bolt having a shank portion extending through the perforation in said second member and threaded for the reception of a nut, the other end having a laterally extending elbow portion extending through the perforation in said first member, the line of intersection of the surfaces of the shank and elbow portions with a plane containing the axes of the shank and elbow portion defining a substantially sharp inside right angle to provide a shoulder extending normal to the axis of the shank portion, said shoulder engaged with the edge of the perforation in said first member, the free end of said elbow portion having a further reverse bent extension disposed on the opposite side of the first member from the shank portion, and a nut on said threaded shank clamping the edge of the first member against the surface of the second member.

References Cited in the file of this patent

UNITED STATES PATENTS

| | | |
|---|---|---|
| 1,400,364 | Knapik | Dec. 13, 1921 |
| 1,605,417 | Willoughby | Nov. 2, 1926 |
| 2,379,752 | Schultz | July 3, 1945 |
| 2,542,753 | De Swart | Feb. 20, 1951 |